(12) United States Patent
Kurata et al.

(10) Patent No.: US 9,903,633 B2
(45) Date of Patent: Feb. 27, 2018

(54) CONTAINER FOR REFRIGERATING MACHINE

(71) Applicant: DENSO CORPORATION, Kariya, Aichi-pref. (JP)

(72) Inventors: Takehiro Kurata, Kariya (JP); Masami Taniguchi, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 406 days.

(21) Appl. No.: 14/417,917

(22) PCT Filed: Jul. 29, 2013

(86) PCT No.: PCT/JP2013/004577
§ 371 (c)(1),
(2) Date: Jan. 28, 2015

(87) PCT Pub. No.: WO2014/020885
PCT Pub. Date: Feb. 6, 2014

(65) Prior Publication Data
US 2015/0168046 A1    Jun. 18, 2015

(30) Foreign Application Priority Data

Jul. 31, 2012  (JP) ................................ 2012-169374
Feb. 1, 2013   (JP) ................................ 2013-018380

(51) Int. Cl.
*F25D 17/04* (2006.01)
*F25D 11/00* (2006.01)
(Continued)

(52) U.S. Cl.
CPC .......... *F25D 11/003* (2013.01); *B65D 88/745* (2013.01); *F25D 17/067* (2013.01);
(Continued)

(58) Field of Classification Search
CPC ...... F25D 11/003; F25D 17/067; F25D 29/00; F25D 1/00; F25D 11/006; F28D 17/02; F25B 2600/112
See application file for complete search history.

(56) References Cited

U.S. PATENT DOCUMENTS 4,711,293 A * 12/1987 Niwa ................... F24F 12/001
                                                     165/10
5,375,649 A    12/1994 Nilsen et al.
(Continued)

FOREIGN PATENT DOCUMENTS

JP    S55107848 A    8/1980
JP    S61192284 U    11/1986
(Continued)

OTHER PUBLICATIONS

Ikemiya et al., Ventilating Unit for Refrigerated Container and Refrigerated Container with Ventilation Function, Oct. 1, 2009, JP2009222323A, Whole Document.*
(Continued)

*Primary Examiner* — Larry Furdge
(74) *Attorney, Agent, or Firm* — Harness, Dickey & Pierce, P.L.C.

(57) ABSTRACT

A container for a refrigerating machine has: a storeroom storing a stored objective; a housing chamber housing an evaporator and an evaporator fan and guiding an inside air in the storeroom to flowing back to the storeroom after passing through the evaporator; a first ventilation duct connected to the housing chamber and having a first blower fan and a first heat storage body; a second ventilation duct connected to the housing chamber and having a second blower fan and a second heat storage body; and a controller controlling the first blower fan and the second blower fan. The controller controls the first blower fan and the second blower fan and switches between (i) a mode in which an
(Continued)

outside air inflows through the first ventilation duct, and the inside air outflows through the second ventilation duct and (ii) a mode in which an outside air inflows through the second ventilation duct, and the inside air outflows through the first ventilation duct, at a specified time interval.

20 Claims, 14 Drawing Sheets

(51) Int. Cl.
    *B65D 88/74*   (2006.01)
    *F25D 17/06*   (2006.01)
    *F25D 29/00*   (2006.01)
    *F28D 17/02*   (2006.01)
    *F25D 1/00*    (2006.01)
(52) U.S. Cl.
    CPC ............ *F25D 29/00* (2013.01); *F28D 17/02* (2013.01); *F25B 2600/112* (2013.01); *F25D 1/00* (2013.01); *F25D 11/006* (2013.01); *Y02B 40/32* (2013.01)

(56) References Cited

U.S. PATENT DOCUMENTS

| | | | | |
|---|---|---|---|---|
| 6,051,198 A | * | 4/2000 | Sano | B01D 53/8659 423/240 S |
| 6,581,544 B1 | * | 6/2003 | Smith | B60P 3/20 119/401 |
| 7,467,522 B2 | * | 12/2008 | Tanaka | F25D 11/003 236/49.3 |
| 2002/0164944 A1 | | 11/2002 | Haglid | |
| 2005/0236150 A1 | | 10/2005 | Chagnot et al. | |
| 2006/0042275 A1 | | 3/2006 | Tanaka | |
| 2009/0071176 A1 | | 3/2009 | Tanaka | |
| 2009/0077986 A1 | | 3/2009 | Tanaka | |
| 2012/0003916 A1 | * | 1/2012 | Iwase | F24F 7/10 454/239 |
| 2012/0149294 A1 | * | 6/2012 | Labrecque | A01K 1/0052 454/353 |

FOREIGN PATENT DOCUMENTS

| | | | |
|---|---|---|---|
| JP | 56358046 A | | 3/1988 |
| JP | H01189473 A | | 7/1989 |
| JP | H09280720 A | | 10/1997 |
| JP | 2002089921 A | | 3/2002 |
| JP | 2004003858 A | | 1/2004 |
| JP | 2004325022 A | | 11/2004 |
| JP | 2005300060 A | | 10/2005 |
| JP | 2007024407 A | | 2/2007 |
| JP | 2009222323 A | * | 10/2009 |
| JP | 2009222323 A | | 10/2009 |
| JP | 2012136287 A | | 7/2012 |

OTHER PUBLICATIONS

International Search Report and Written Opinion (in Japanese with English Translation) for PCT/JP2013/004577, dated Oct. 29, 2013; ISA/JP.

Office Action dated Dec. 25, 2015 issued in the corresponding CN application No. 201380040326.0 in Chinese with English translation.

Office Action dated Jan. 19, 2016 issued in the corresponding SG application No. 11201500109Y.

Office Action dated Jul. 28, 2015, mailed in the corresponding JP application No. 2013-018380 with English translation.

Office Action dated Jun. 19, 2015 in corresponding Singapore Application No. 11201500109Y.

* cited by examiner

FRONT VIEW OF HEAT STORAGE BODY

ENLARGED VIEW OF LATTICED PART

DOOR IS OPEN (FAN OPERATES)

DOOR IS CLOSED (FAN STOPS)

CONTAINER FOR REFRIGERATING MACHINE

CROSS REFERENCE TO RELATED APPLICATIONS

This application is a U.S. National Phase Application under 35 U.S.C. 371 of International Application No. PCT/JP2013/004577 filed on Jul. 29, 2013 and published in Japanese as WO 2014/020885 A1 on Feb. 6, 2014. This application is based on and claims the benefit of priority from Japanese Patent Application No. 2012-169374 filed on Jul. 31, 2012 and Japanese Patent Application No. 2013-18380 filed on Feb. 1, 2013. The entire disclosures of all of the above applications are incorporated herein by reference.

TECHNICAL FIELD

The present disclosure relates to a container for a refrigerating machine (that will be referred to as the container hereafter) having a ventilator and storing produce such as vegetables and fruits, flowers, or the like. The container includes a transport container and a transport vehicle refrigerating machine.

BACKGROUND ART

Conventionally, a ventilating part of the container for a refrigerating machine is known to perform ventilation by sliding an opening-closing member, which is attached to cover a vent that is formed on a wall surface of the container, along the wall surface, as described in Patent Document 1. According to this conventional technique, since the ventilation is performed by using a pressure difference caused between an upstream side and a downstream side in a flow direction of air that is blown by an evaporator fan of the refrigerating machine disposed in the container, a location of the vent is required to correspond to a location of the evaporator fan. Alternatively, a duct is extended from the vent located at an arbitrary location to the evaporator fan, and the ventilation is performed. However, the conventional technique may cause the following possibilities.

Since warm air is taken in from an outside of the container in the ventilation in a case that outside air at an outside of the container is warm, and that inside air at an inside of the container is cool, a cooling load of the refrigerating machine increases to cool the warm air inflowing to the container. In the result, energy efficiency, in other words, electric power of the refrigerating machine or fuel consumption, may deteriorate.

According to the conventional technique, since the ventilation is performed based on the pressure difference due to the evaporator fan, a ventilation amount constantly varies depending on an operation condition of the evaporator fan. Accordingly, there is a possibility that a stable ventilation amount cannot be secured.

Since the vent is located at a high location, there is a possibility that a maintenance is inefficient.

Since the duct extends to a location corresponding to the evaporator fan in a case that the vent is located at an arbitrary location, a space may be decreased, or a cost may increase.

PRIOR ART LITERATURES

Patent Literature

[Patent Document 1]
JP-A-H09-280720

SUMMARY OF INVENTION

It is an objective of the present disclosure to provide a container for a refrigerating machine in which a heat storage body is located in a ventilation duct to recover heat of air inflowing or outflowing, and with which a cooling load is reduced.

According to an aspect of the present disclosure, a container for a refrigerating machine has: a storeroom storing a stored objective; a housing chamber housing an evaporator and an evaporator fan and guiding an inside air in the storeroom to flowing back to the storeroom after passing through the evaporator; a first ventilation duct connected to the housing chamber and having a first blower fan and a first heat storage body; a second ventilation duct connected to the housing chamber and having a second blower fan and a second heat storage body; and a controller controlling the first blower fan and the second blower fan. The controller controls the first blower fan and the second blower fan and switches between (i) a mode in which an outside air inflows through the first ventilation duct, and the inside air outflows through the second ventilation duct and (ii) a mode in which an outside air inflows through the second ventilation duct, and the inside air outflows through the first ventilation duct, at a specified time interval.

According to an aspect of the present disclosure, a container for a refrigerating machine has: a storeroom storing a stored objective; a housing chamber housing an evaporator and an evaporator fan and guiding an inside air in the storeroom to flowing back to the storeroom after passing through the evaporator; a first ventilation duct connected to the housing chamber and having a first blower fan and a first heat storage body; a second ventilation duct connected to the housing chamber and having a second blower fan and a second heat storage body; and a controller controlling the first blower fan and the second blower fan. The container for a refrigerating machine further comprising a third ventilation duct, and a pressure loss at the third ventilation duct is smaller than a pressure loss at the first ventilation duct or a pressure loss at the second ventilation duct.

EMBODIMENTS FOR CARRYING OUT INVENTION

The present disclosure will be described hereafter referring to drawings. In each embodiment, a part that corresponds to a matter described in a preceding embodiment may be assigned with the same reference number, and redundant explanation for the part may be omitted. The present disclosure relates to a container for a refrigerating machine having a ventilator, and the container is for storing, for example, a plant (e.g., ornamental flowers or greens) or a produce such as vegetables or fruits. The container includes a transport container and a transport vehicle refrigerating machine. It can be applied for a refrigeration unit cooling an inside of the transport container, a refrigerating machine for a back of a truck, or the like. Ventilation is important since ventilation affects a freshness of the produce or the like. According to the present disclosure, in a ventilator having a mechanism that closes a vent, a heat recovering part reducing a heat loss in the ventilation is attached.

A heat storage body that is storable heat in a ventilation duct is used as the heat recovering part such that all heat (i.e., latent heat and sensible heat) of ventilation air is once stored (i.e., recovered) in the heat storage body to reduce the cooling load. Once the heat storage body stores a maximum amount of heat during a heat storage, the heat storage body cannot store further heat in the following ventilation. Then, by using plural heat storage bodies, and by switching flow directions of air alternatively, one of the heat storage bodies radiates heat stored in the one of the heat storage bodies to outflowing air while an another one of the heat storage bodies stores heat of inflowing air. Accordingly, a heat storage performance of the heat storage body is recovered. By switching between an inflow route and an outflow route at a specified time interval, a heat exchange can be stably performed in high efficiency. Although two heat storage bodies for the inflow side and the outflow side are used in the present disclosure, the number of the heat storage bodies is not limited as long as at least the two heat storage bodies are disposed. Preferably, the two heat storage bodies for the inflow side and the outflow side make a set, and inflow and outflow are balanced by using plural sets of the heat storage bodies.

First Embodiment

Figure 2:
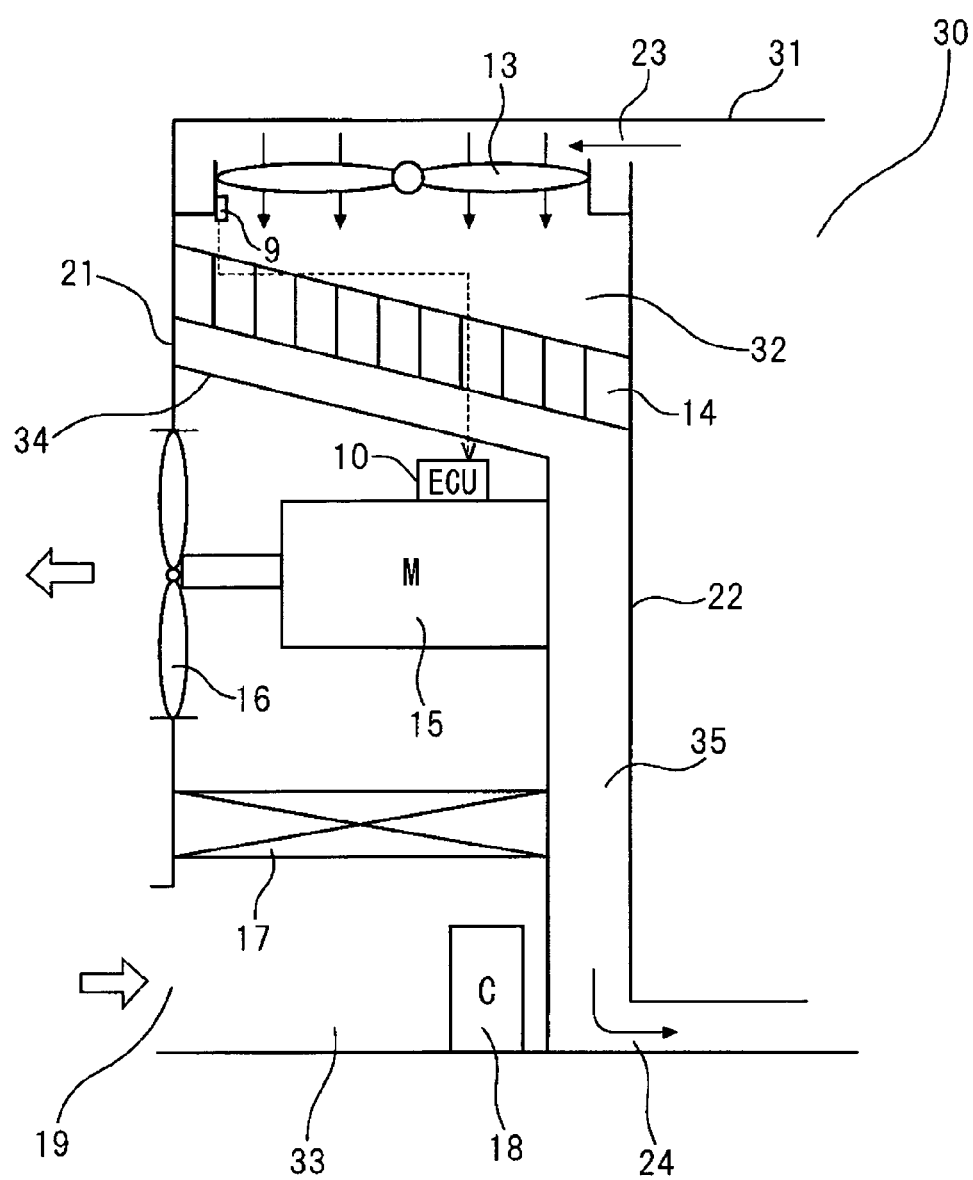
FIG. 2 is a cross-sectional diagram regarding a line II-II in FIG. 1.
Figure 3:
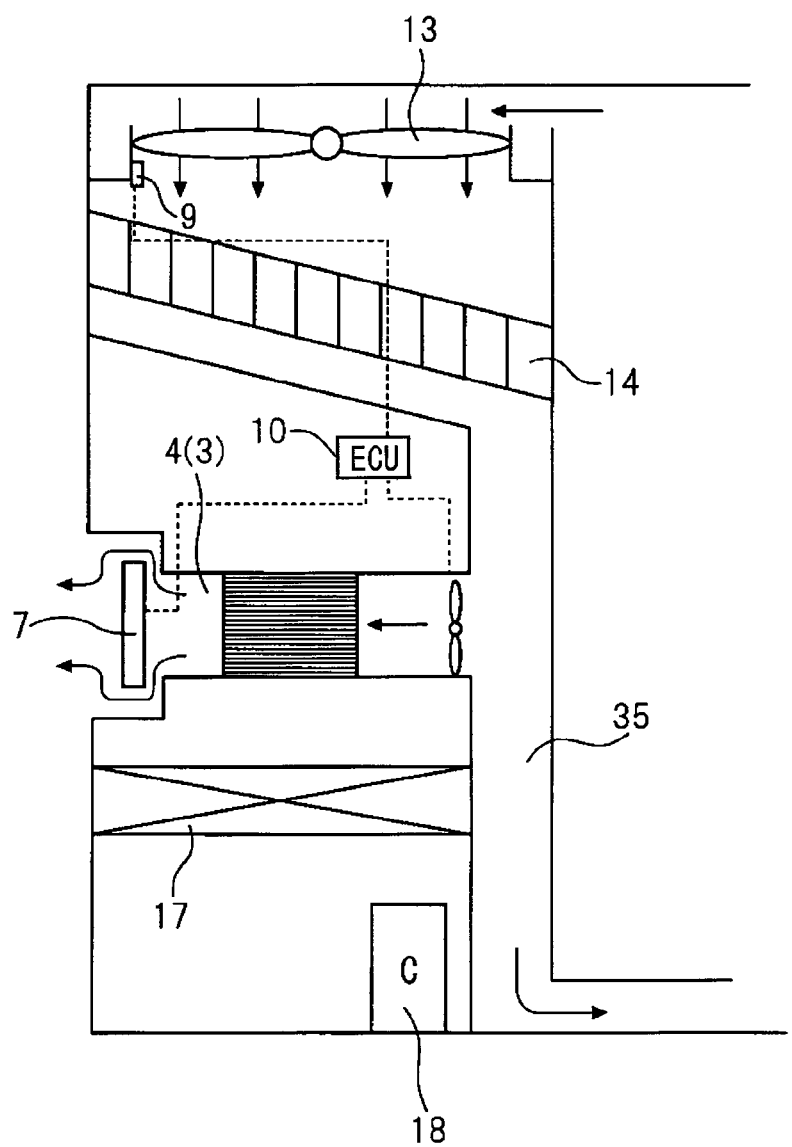
FIG. 3 is a cross-sectional diagram regarding a line III-III in FIG. 1.

A first embodiment of the present invention will be described hereafter referring to FIGS. 1 to 3. A casing 31 is formed in a rectangular parallelepiped shape, and a conditioned room (i.e., a storeroom) 30 houses a stored objective such as produce, for example, vegetables or fruits, or an objective to be transported. When an evaporator fan 13 rotates, an inside airflow is caused, and an airflow from the conditioned room 30 is guided to flowing back to the conditioned room 30 after passing through the evaporator 14.

An interior housing chamber 32 is provided between a front surface 21 and a back surface 22 and partitioned by an exterior housing chamber 33 and a partition wall 34. The back surface 22 faces the conditioned room 30 located in the container. The interior housing chamber 32 communicates with the conditioned room 30 located in the container for a refrigerating machine through a vent 23 and a vent 24 that are formed near an upper end and a lower end of the back surface 22, respectively. The evaporator fan 13 and the evaporator 14 are disposed in the interior housing chamber 32. A compressor 18 and a condenser 17 are disposed in the exterior housing chamber 33. A condenser-fan motor 15 operates a condenser fan 16 rotatably to cause an airflow in which an outside air flows into the exterior housing chamber 33 through an outside-air opening 19, and the outside air is emitted outside after passing through the condenser 17. A door 7 preventing air from being guided to flowing into the container when ventilation is not performed is disposed at an outside-air side opening of ventilation ducts 3, 4. A door switching apparatus 11 operates the door 7 to perform the ventilation.

The casing 31 and the partition wall 34 that is located between the interior housing chamber 32 and the exterior housing chamber 33 are formed by a thermal insulating wall such that the conditioned room 30 and the interior housing chamber 32 are prevented from conducting heat. The compressor 18, the condenser 17, an un-shown expansion valve, and the evaporator 14 described above configure a refrigerant cycle. The airflow flowing from the conditioned room 30 through the vent 23 is cooled in the evaporator 14, and a cooled conditioned air (i.e., an inside circulating air) is guided to flowing into the conditioned room 30 through the vent 24. On the other hand, in the exterior housing chamber 33, outside air from the outside-air opening 19 is guided to passing through the condenser 17.

A ventilator 8 of the present embodiment will be described hereafter, referring to FIGS. 1 and 3. Although the ventilator 8 is configured as a unit, it is not necessarily limited to be configured as a unit. In the container for a refrigerating machine used to store or transport fruits, vegetables, or the like, it is required to ventilate inside air appropriately such that the fruits, the vegetables, or the like are kept to be fresh. To ventilate an inside of the conditioned room 30, the ventilator 8 has: heat storage bodies 1, 2 (i.e., a first heat storage body 1 and a second heat storage body 2) storing heat or cold; the ventilation ducts 3, 4 (i.e., a first ventilation duct 3 and a second ventilation duct 4) introducing air into the container; blower fans 5, 6 (i.e., a first blower fan 5 and a second blower fan 6) blowing air into a passage; and the door 7 preventing air from inflowing when the ventilation is not performed. The door switching apparatus 11 moves the door 7 in a left-right direction in FIG. 1 to close both the ventilation ducts 3, 4 at the same time when the ventilation is not performed. Although the door 7 moves in a flow direction in the passage in the above case, it is not limited, and the door 7 may be a slidable door moving in a vertical direction. A door may be disposed to each of the ventilation ducts 3, 4, separately. A mesh that is smaller than a hole diameter of the heat storage body may be attached to a vent 7a to restrict a performance deterioration due to a dust entering into the heat storage body.

A gas concentration detector 9 detecting a gas concentration at an inside of the container for a refrigerating machine is disposed in the interior housing chamber 32. A gas of which concentration is detected is, for example, carbon dioxide ($CO_2$) or oxygen. An output of the gas concentration detector 9, an inside temperature Tin in the conditioned room, an outside temperature Tout outside the casing 31, a set temperature Tset for the conditioned room, or the like are input to a controller (ECU) 10 controlling the ventilator 8, and the controller 10 operates the blower fans 5, 6, the door switching apparatus 11, the gas concentration detector 9, or the like.

Figure 1:
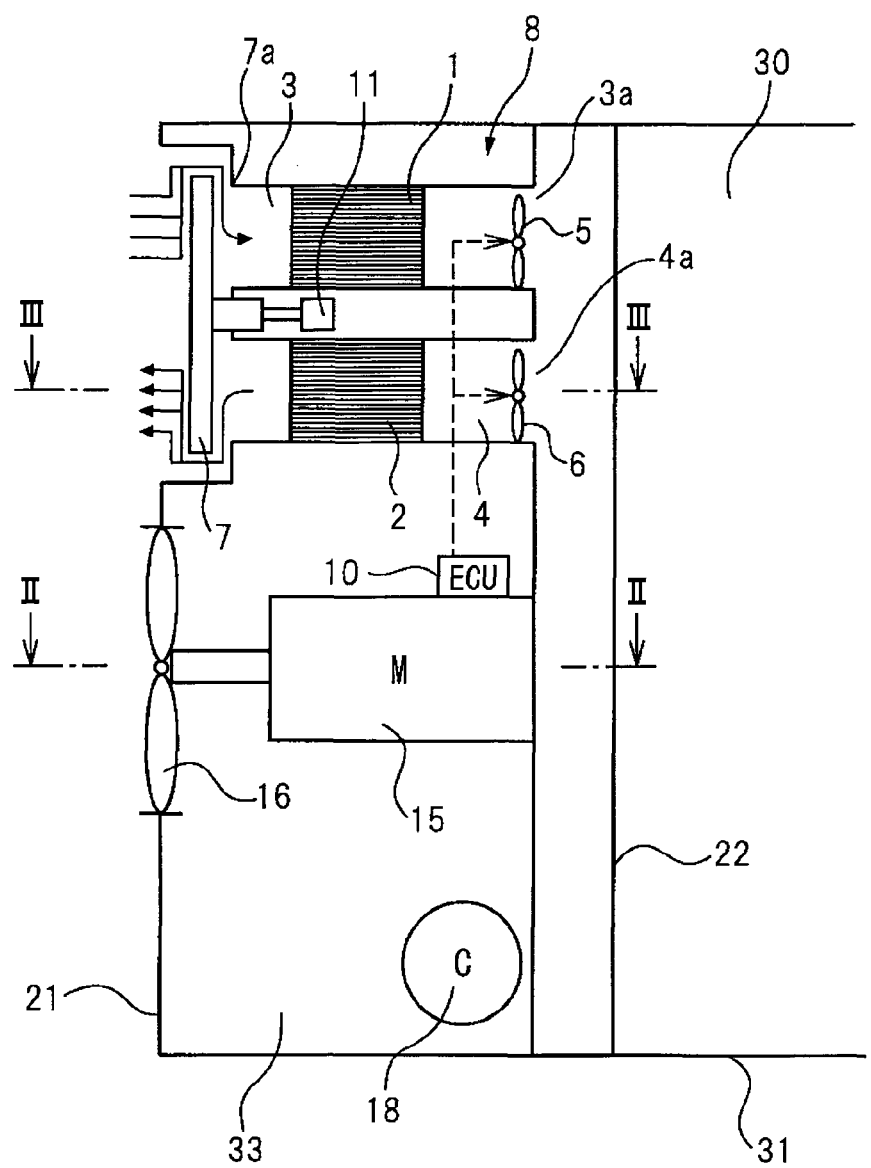
FIG. 1 is a schematic plan diagram illustrating a container for a refrigerating machine according to a first embodiment.

As shown in FIG. 1, when the ventilation is performed, the blower fan 5 is initially operated to introduce outside air into the ventilation duct 3 in which the heat storage body 1 is housed. Total heat of outside air at a time of an outside-air introduction is stored (i.e., recovered) in the heat storage body 1 (in a case of low temperature). Accordingly, the total heat of introduced air that is introduced into the container is reduced, and an increase of a heat load in the conditioned room 30 can be restricted. When the outside air is introduced into the ventilation duct 3 housing the heat storage body 1, an inside pressure in the container increases due to the introduced outside air, and inside air is emitted through the ventilation duct 4 housing the heat storage body 2. Therefore, the blower fans may be arranged to cause an airflow such that outside air inflows through both of the blower fans. When the ventilation is performed, only the blower fan 5 (6) at an inflow-air side is operated, and the blower fan 6 (5) at an outflow-air side is stopped. The blower fan at the outflow-air side may be operated reversely to cause an outflow.

As shown in FIG. 1, arrangement locations of the ventilation ducts 3, 4 in the vertical direction are better to be on a same flat surface (i.e., on a same level). As shown in FIGS. 2 and 3, an airflow after passing through the vent 23 (i) passes through the evaporator 14, (ii) flows downward in the vertical direction in a passage 35 that is located between the front surface 21 and the back surface 22 of the interior housing chamber 32, and (iii) is guided to flowing into the conditioned room 30 through the vent 24. In a case that vertical locations of connecting ports 3a, 4a of the ventilation duct 3, 4 are different from each other, a short circuit in which outside air introduced at the time of outside-air introduction through the ventilation duct 3 is directly emitted through the ventilation duct 4 is caused, and the ventilation may be insufficient. To restrict the above issue, the connecting ports 3a, 4a of the ventilation ducts 3, 4 are better to be attached such that the connecting ports 3a, 4a are located parallel with each other in a flow direction of inside circulating air in the passage 35, in a case that the inside circulating air flows in the vertical direction. That is, the connecting ports 3a, 4a are arranged such that a center of the connecting port 3a of the ventilation duct 3 and a center of the connecting port 4a of the ventilation duct 4 are not located in sequence from upstream to downstream in a flow direction of the inside circulating air.

Then, the heat storage body 2 radiates heat by being cooled due to cold heat of the inside air, and a heat storing capacity is recovered. When a flow direction of inflow-outflow is fixed, a heat storage capacity of the heat storage body 1 is saturated, and eventually, the total heat of hot heat of outside air cannot be stored in the heat storage body even when the outside air is introduced to the heat storage body 1. Accordingly, high-temperature air that is located at close to the outside air inflows into the container, and the thermal load cannot be reduced. Therefore, a flow direction of air in the ventilation ducts 3, 4 is reversed at a specified time interval Tn such that outside air is introduced to the ventilation duct 3 in which the heat storage body 2 of which heat storing capacity is recovered is disposed, and that inside air is introduced to the ventilation duct 4 in which the heat storage body 1 of which a heat storage capacity is saturated is disposed. Then, the heat storing capacity of the heat storage body 1 is recovered.

Figure 9:
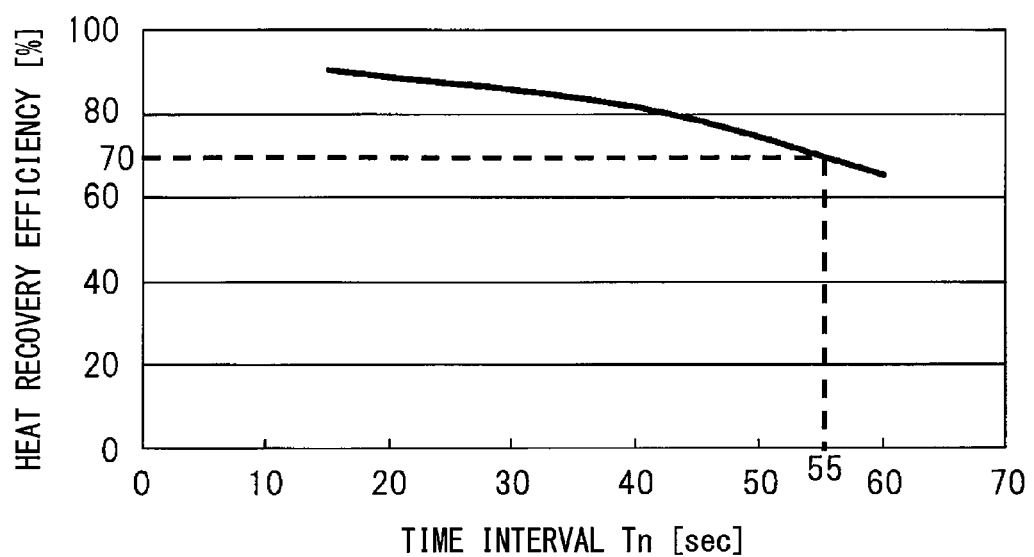
FIG. 9 is a graph showing a relation among a switching time interval and a heat recovery percentage.

The heat storage body used in the present embodiment can be made of any material as long as being storable heat. For a structure, the heat storage body may be formed in any shape, and a front shape of the heat storage body is not limited to a round shape, a square shape, or the like. The time interval Tn at which the flow is reversed is preferably longer than or equal to 10 seconds by considering an efficiency and a balance of an air amount. On the other hand, a duration of 3-10 seconds is required to switch flow directions caused by the blower fans 5, 6, and the air amount cannot be provided stably when Tn is shorter than or equal to 10 seconds. Furthermore, by considering both an air pressure loss and a ventilation rate, Tn is required to be shorter than or equal to 55 seconds to secure a heat recovery efficiency to be greater than or equal to 70% in a case that a front air speed relative to the heat storage body is set to about 1.0 m/s, and in a case that the heat storage body is a high-efficiency storage body. The high-efficiency storage body has (i) a latticed part of which hydraulic diameter is longer than or equal to 1.4 mm and shorter than or equal to 2.0 mm, and of which a thickness between the latticed part is larger than or equal to 0.3 mm and smaller than or equal to 0.4 mm, and (ii) a length that is longer than or equal to 100 mm and shorter than or equal to 200 mm. Furthermore, at the front air speed of 1.0 m/s, the heat recovery efficiency is shown in a graph of FIG. 9 when the heat storage body satisfies the above ranges. Tn may be set to 35 seconds depending on a raising characteristic of the blower fan.

The hydraulic diameter De is a diameter determined by converting a diameter of a cross-sectional area that has a shape (e.g., a square shape, a rectangular shape, or the like) except for a round shape to a corresponding diameter of the round shape. The hydraulic diameter De is expressed in a following formula.

$De = 4Af/Wp$ (Af: an area of the cross section, Wp: a peripheral length of the cross section)

Figure 10A:
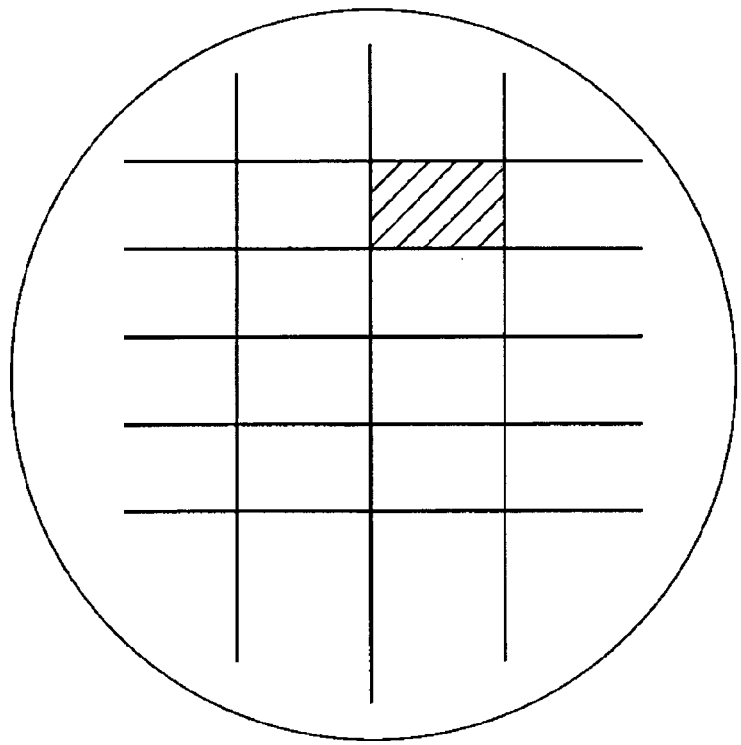
FIG. 10A is a schematic front diagram illustrating a heat storage body.
Figure 10B:
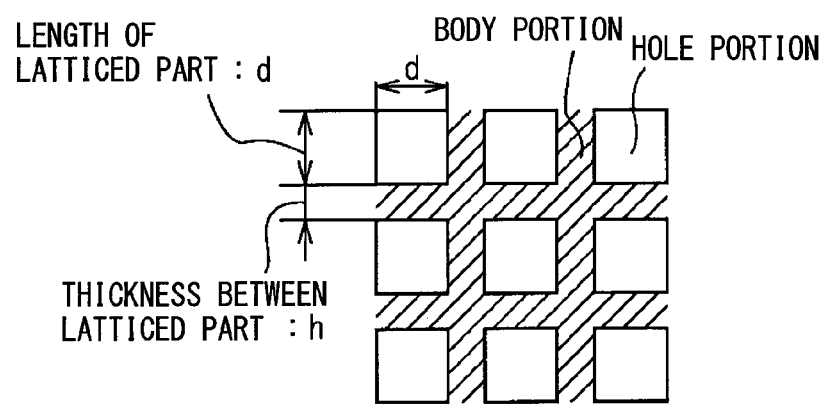
FIG. 10B is a partial enlarged diagram explaining a latticed portion of the heat storage body illustrated in FIG. 10A.

For example, the hydraulic diameter De of a square lattice (i.e., the length d of the latticed part) shown in FIGS. 10A and 10B is expressed in a following formula.

$De = 4d^2/4d = d$

The thickness h between the latticed parts is a thickness of a body portion shown in FIG. 10B.

Figure 12:
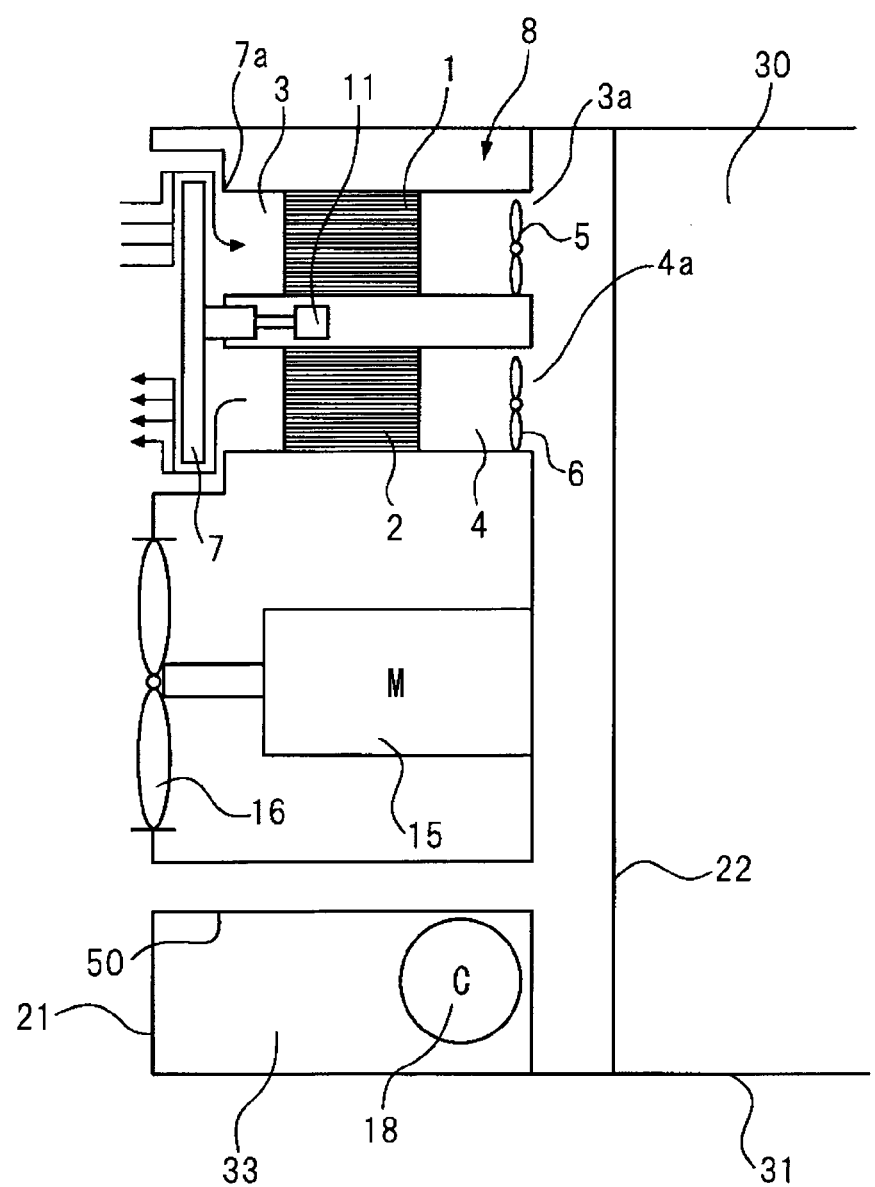
FIG. 12 is a schematic plan diagram illustrating a container for a refrigerating machine according to a modification regarding the first embodiment.
Figure 13:
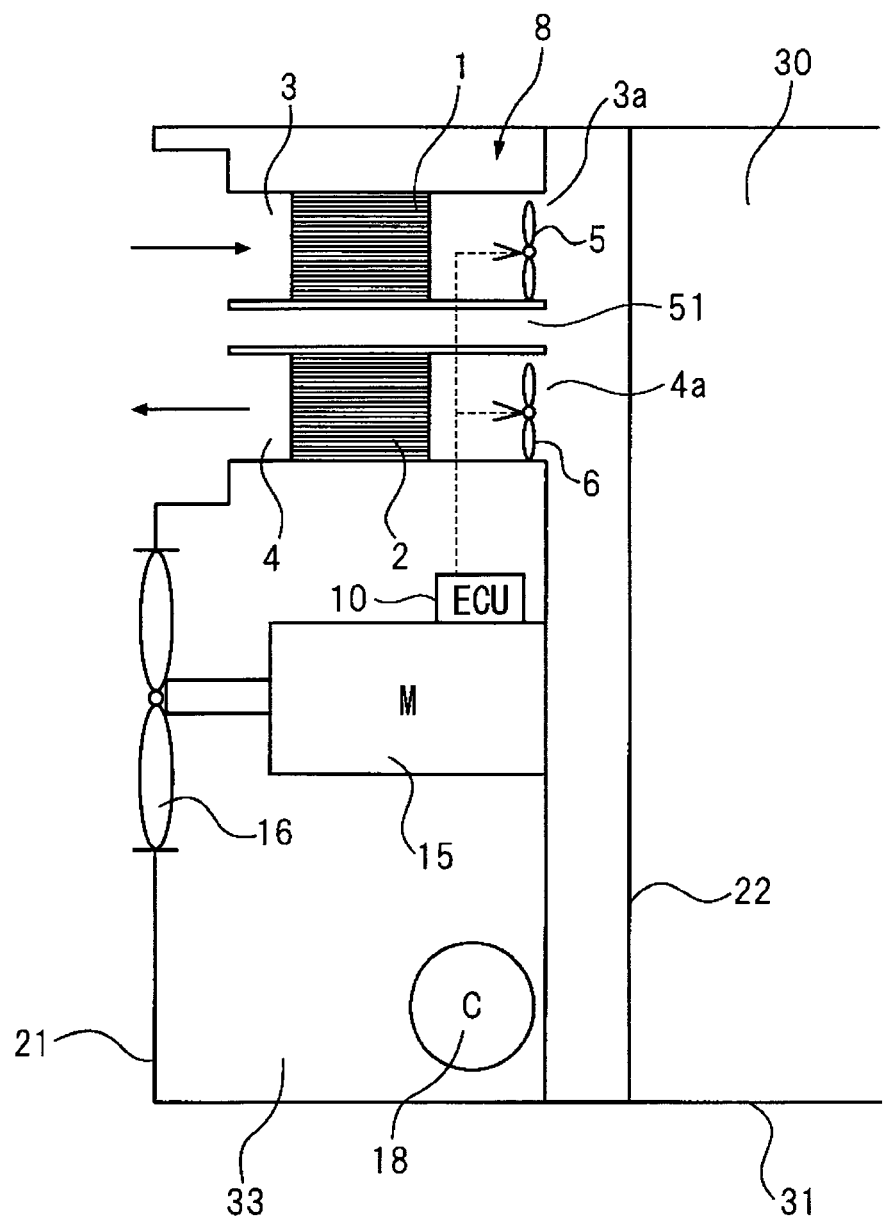
FIG. 13 is a schematic plan diagram illustrating a container for a refrigerating machine according to a modification regarding the first embodiment.
Figure 14:
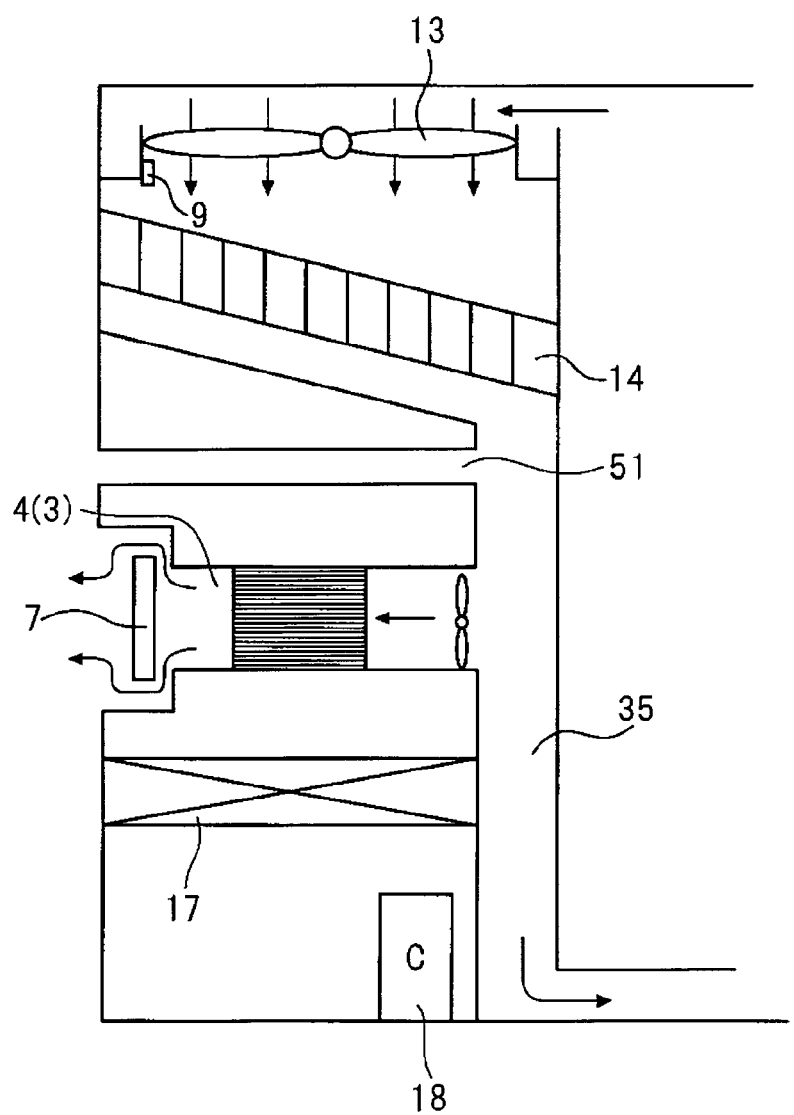
FIG. 14 is a schematic cross-sectional diagram regarding a line corresponding to the line III-III in FIG. 1 and illustrating a container for a refrigerating machine according to a modification regarding the first embodiment.

By switching the above cycle at the specified time interval using the controller 10, an increase of the thermal load can be kept being restricted. In a common transportation, the inflow and the outflow are performed in a low pressure-loss range with a low air volume that is about 0-30 [$m^3$/h]. However, in a transportation of flowers or the like requiring a large amount of air, there is a fear that an accurate air amount cannot be secured since a pressure loss in a high pressure-loss range increases. To restrict the pressure loss, the blower fan 5 or the blower fan 6, or both of them are operated at an inflow side, and a bypass duct (i.e., a third ventilation duct) 50 of which pressure loss is small is disposed appropriately for an outflow, as shown in FIG. 12. In FIG. 12, the bypass duct 50 is located in parallel with the ventilation ducts 3, 4 in a flow direction of air in the interior housing chamber 32 or the passage 35 such that the condenser-fan motor 15 is located between the ventilation ducts 3, 4 and the bypass duct 50. As another option, as shown in FIG. 13, a bypass duct 51 of which pressure loss is smaller than that of the ventilation ducts 3, 4 may be disposed for the outflow of air, instead of the bypass duct 50. In FIG. 13, the bypass duct 51 is located between the ventilation duct 3 and the ventilation duct 4. As shown in FIG. 14, the bypass duct 51 is located at an upstream of the ventilation ducts 3, 4 in the flow direction of air in the interior housing chamber 32 or the passage 35. Accordingly, the short circuit of air can be prevented from occurring in a case that air is guided to inflowing from both the ventilation duct 3 and the ventilation duct 4 and to outflowing through the bypass duct 51. Conversely, the bypass duct 51 may be located at a downstream of the ventilation ducts 3, 4 in the flow direction of air to restrict the occurrence of the short circuit when there is a possibility that air outflows from both of the ventilation duct 3 and the ventilation duct 4 and inflows through the bypass duct 51.

When the inside temperature Tin in the container for a refrigerating machine is equal to the outside temperature Tout that is a temperature around the container, an effect to reduce the thermal load is extremely low. Therefore, according to the present embodiment, when a temperature difference between the inside and the outside of the container is smaller than or equal to, for example, 5° C., an alternate operation (e.g., ON, OFF) between the blower fans 5, 6 for reducing the above thermal load is not performed, on the other hand, one of or both of the blower fans are continuously operated (i.e., normally ON).

As described above, for storing the produce, the ventilation is required for eliminating an abnormality such as an abnormality in development due to a decrease of $O_2$ concentration caused by a respiration of the produce or an increase of $CO_2$ concentration caused by an emission of the produce. Conventionally, when produce is stored, it is well known that a storage duration is extended by storing the produce at a specific gas concentration (i.e., a specific concentration different from that of atmospheric air) that is specific to the produce. Therefore, according to the present embodiment, two ventilation modes of (i) a single ventilation mode in which the ventilation is constantly performed to eliminate the abnormality of produce and (ii) a concentration-control and ventilation mode in which a specific gas concentration Cset can be kept for extending the storage duration can be performed. The concentration-control and ventilation mode will be described after. In both ventilation modes, the thermal load can be reduced by the above operation. That is, the thermal loss is reduced by storing hot heat of inflowing air in the heat storage body during an inflow, and conversely, the hot heat stored in the heat storage body is radiated to cool heat of outflowing air during an outflow, and thus, the heat storing performance is recovered.

The single ventilation mode of the present embodiment will be described referring to a flow chart in FIG. 4.

First, a target ventilation rate is set at S101. A rotation speed of the blower fan is set at S102 since a relation among a rotation speed of the blower fans 5, 6 and the ventilation rate is determined empirically. Subsequently, the outside temperature Tout and the inside temperature Tin at an inside of the conditioned room 30 are compared to each other at S103, and a flow of the flow chart in FIG. 4 advances to S105 when the difference is larger than 5° C. In a case of No, the flow advances to S104, and the blower fan is performed continuously (i.e., continuously ON). In this case, when only one of the blower fans 5, 6 is operated, a state determined at a determination timing of S103 may be continued. Subsequently, the flow returns to S103.

In a case of Yes at S103, the flow advances to S105, the blower fan 5 is turned ON, and the blower fan 6 is turned OFF. That is, outside air inflows through the ventilation duct 3, and inside air outflows through the ventilation duct 4. When outside air is introduced through the ventilation duct 3, the outside air having hot heat radiates total heat to the heat storage body 1, and the outside air starts to flow into the passage 35 from the interior housing chamber 32. On the other hand, inside air is introduced to the ventilation duct 4 in which the heat storage body 1 of which heat storage capacity is saturated is disposed, and the heat storage capacity of the heat storage body 1 is recovered. In such a heat recovery mode, a loop S105-S107 is executed in cycles until an operation duration i reaches n (i.e., the specified time interval Tn). When the operation duration i reaches n at S106, the flow direction is subsequently reversed such that outside air inflows through the ventilation duct 4, and inside air outflows through the ventilation duct 3.

A loop S108-S110 in the heat recovery mode is executed in cycles until an operation duration j reaches n (i.e., the specified time interval Tn). When the operation duration j reaches n at S109, the flow returns to S103, and the outside temperature Tout and the inside temperature Tin in the conditioned air are compared to each other again, and the heat recovery mode is repeated.

The above single ventilation mode is a mode in which the ventilation is performed continuously to eliminate the abnormality of the produce. When the produce is stored in the container having a refrigerating machine in this mode, the ventilation rate required for the produce is determined when starting storing, and the ventilation is performed continuously at a determined ventilation rate while storing the produce. The determined ventilation rate is not changed while storing the produce. Since a gas concentration in the container varies depending on a state of the produce, the ventilation rate is set to be lower than a gas concentration with which the storage duration can be extended. The gas concentration may be appropriately adjusted manually, in some cases.

Second Embodiment

Figure 5:
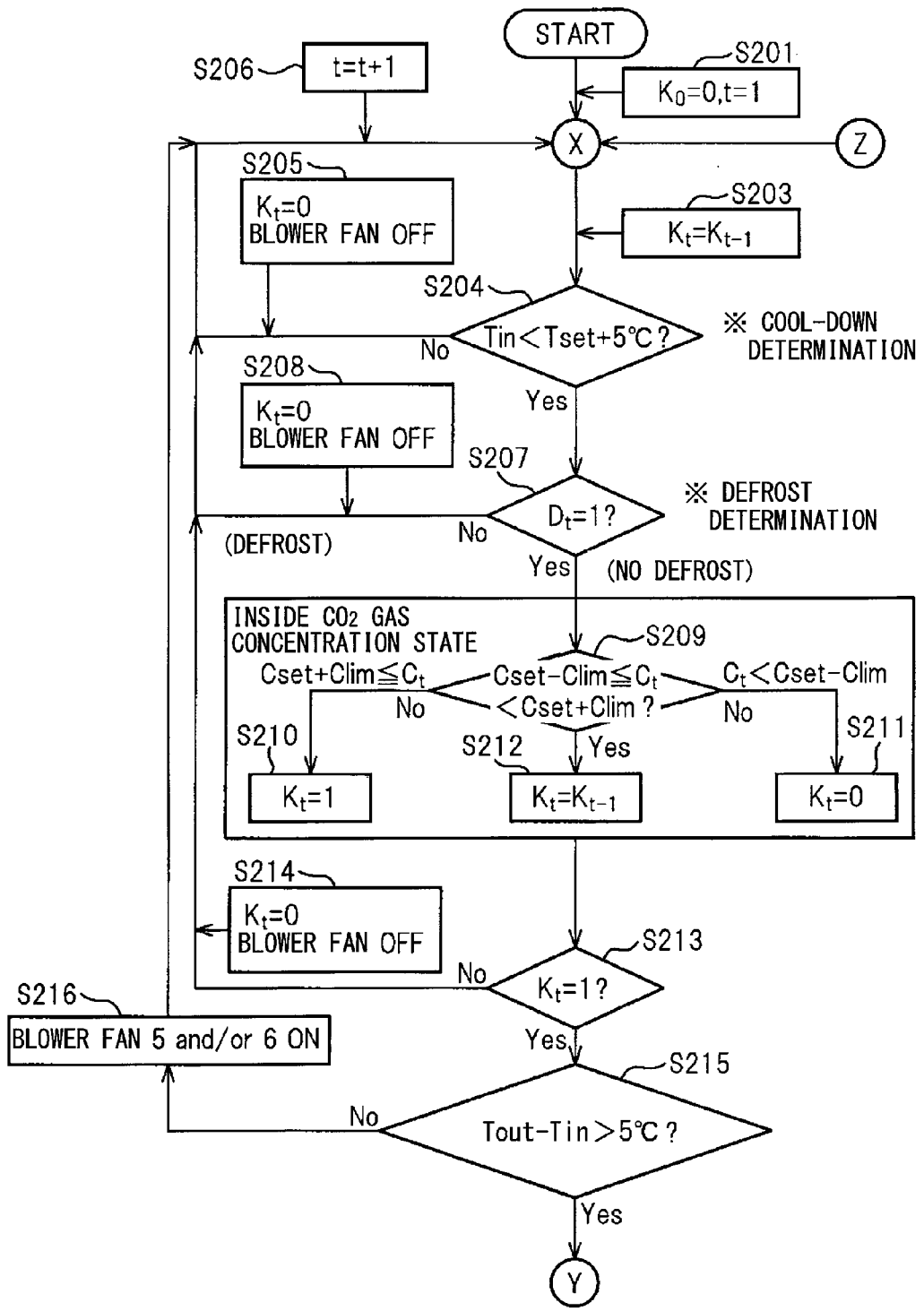
FIG. 5 is a control flow chart according to a second embodiment.
Figure 6:
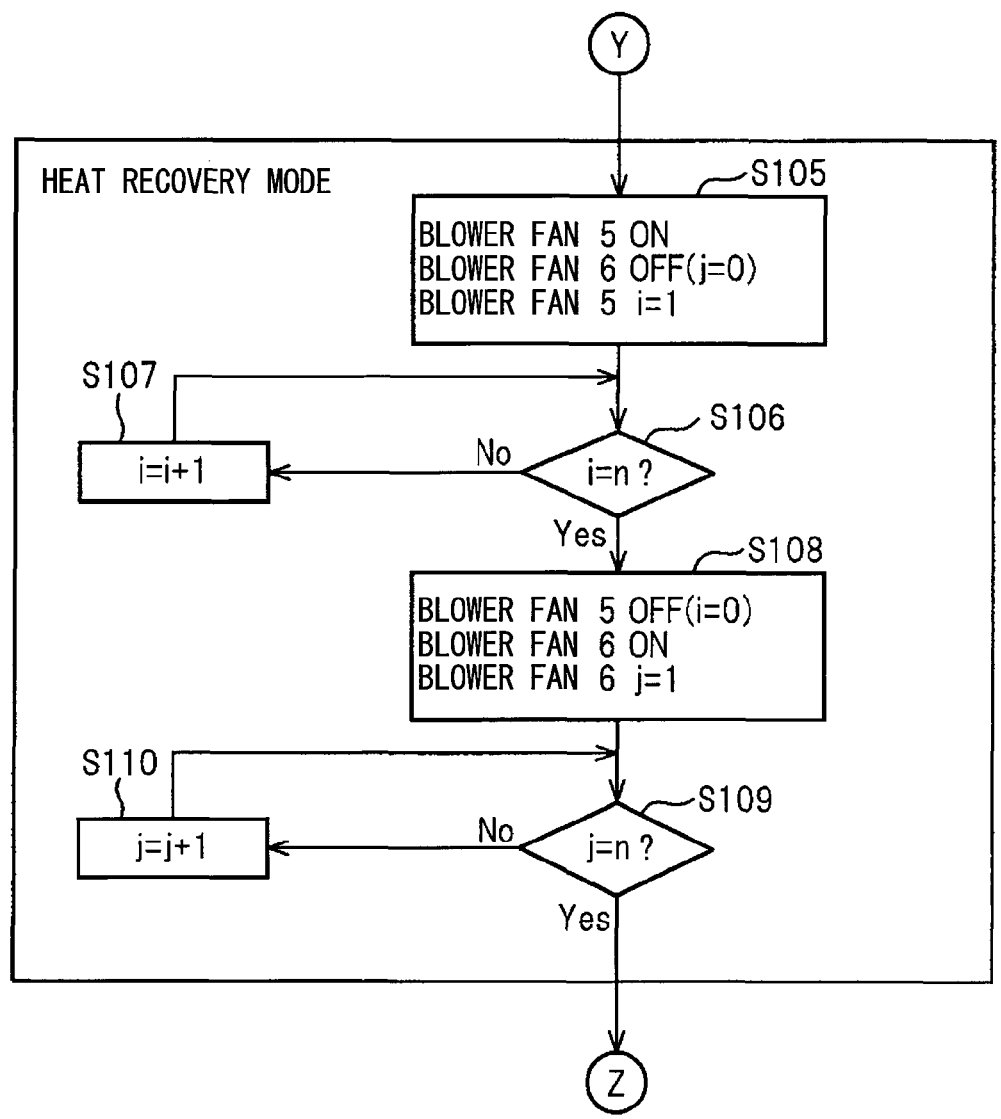
FIG. 6 is a control flow chart according to the second embodiment.

A second embodiment is an embodiment including a concentration-control and ventilation mode (i.e., a detection of $CO_2$ gas concentration) as shown in FIGS. 5, 6.

In the concentration-control and ventilation mode, the controller 10 determines a difference between a detected gas concentration detected by the gas concentration detector 9 and an optimum gas concentration that is optimum for storing a produce such that a gas concentration in the container for a refrigerating machine is kept at an optimum value. When the detected gas concentration is lower than the optimum gas concentration, the door switching apparatus 11 closes the vent 7a. When the detected gas concentration is higher than the optimum gas concentration, the door switching apparatus 11 opens the vent 7a, and the blowing part 5 is operated to start performing ventilation. The optimum gas concentration can be kept by sequentially detecting the gas concentration using the gas concentration detector 9, and by determining the deference between the detected gas concentration and the optimum gas concentration. An example detecting a gas concentration of carbon dioxide will be described hereafter.

The example of detecting the $CO_2$ gas concentration regarding the concentration-control ventilation mode will be described referring to flow charts in FIGS. 5 and 6.

A flow of the flow chart in FIG. 5 is initialized at S201. A time t is set to 1. A flag for an operation state of the blower fan at the time t is defined as Kt. When $K_t$ is a flag 0, the blower fan is OFF. On the other hand, when $K_t$ is a flag 1, the blower fan is ON. An initial setting $K_0$ is 0 (i.e., the blower fan is OFF). Subsequently, the flow advances to S203 through a confluence X, and $K_t$ is updated to be a last value. A cool-down determination is executed at S204. That is a case in which, for example, the inside temperature Tin in the conditioned room 30 is high since the refrigerating machine is operated at a first time, and in which an inside of the conditioned room 30 is cooled rapidly without ventilation. When a set temperature of the inside temperature Tin is referred to as Tset, the flow advances to S205 and returns to the confluence X as $K_t=0$ (i.e., the blower fan is OFF), in a case that the inside temperature Tin is higher than or equal to Tset+5° C. On the other hand, the flow advances to S207 in a case that the inside temperature Tin is lower than Tset+5° C.

A defrost determination for the refrigerating machine is executed at S207. It is determined whether the refrigerating machine is frosted or not. The defrost determination may be performed in a well-known manner, for example, at an outlet temperature of the evaporator. $D_t$ is a defrost determination flag, and a defrost is not performed when $D_t$ is 1, and the defrost is performed (e.g., by a heater) when $D_t$ is 0. In a case of No ($D_t=0$) at S207, the flow advances to S208. Subsequently, the flow returns to the confluence X, and the loop is executed in cycle until $D_t$ becomes 1 (i.e., $D_t=1$) at S207. When $D_t$ is determined to be 1 (i.e., $D_t=1$) at S207, the flow advances to S209, and a gas concentration state is determined.

At S209, it is determined whether the detected gas concentration Ct detected by the gas concentration detector 9 is within a specified range Clim of a set gas concentration Cset or not. That is, the flow advances to S211 when Ct is lower than a lower limit (i.e., a first threshold) Cset−Clim, and advances to S213 as $K_t=0$ (i.e., the blower fan is OFF) while a present state is kept. On the other hand, the flow advances to S210 when Ct is higher than or equal to an upper limit (i.e., a second threshold) Cset+Clim, and advances from S213 to S215 as $K_t=1$ (i.e., the blower fan is ON). Then, a heat recovery mode starts, and the ventilation is performed. At S209, when Ct is higher than or equal to the lower limit (i.e., the first threshold) Cset−Clim and is lower than the upper limit (i.e., the second threshold) Cset+Clim, the last value of $K_t$ is kept at S212, and the flow advances to S213. In a case of $K_t=1$, the flow advances to S215. In a case of $K_t=0$, the loop is executed in cycle until $K_t$ is determined to be 1. When $K_t$ is determined to be 1 (i.e., the blower fan is ON), the flow advances from S213 to S215. Then, the heat recovery mode starts, and the ventilation is performed.

Figure 4:
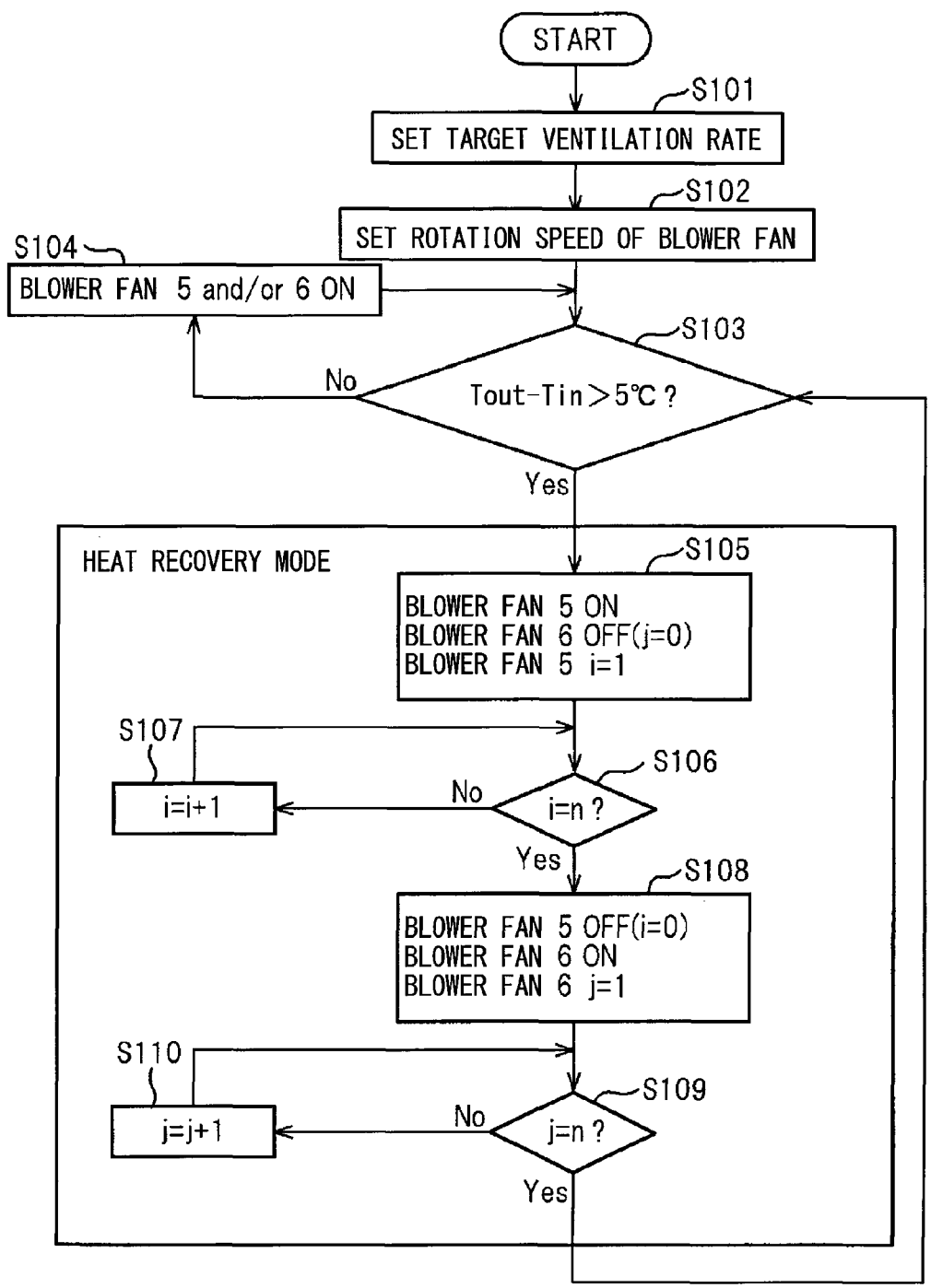
FIG. 4 is a control flow chart according to the first embodiment.

At S215, similar to S103 in FIG. 4, the outside temperature Tout and the inside temperature Tin in the conditioned room 30 are compared to each other at S215. When the difference is larger than or equal to 5° C., the flow advances to S105 through a section Y shown in FIG. 6. In a case of NO at S215, the flow advances to S216, and the blower fan is continuously performed (i.e., continuously ON). In this case, when one of the blower fans 5, 6 is operated, a state determined at a determination timing of S215 may be kept. Subsequently, the flow returns to the confluence X and executes a loop from S204 in cycle. When the difference between the outside temperature Tout and the inside temperature Tin becomes higher than or equal to 5° C., the flow advances to the section Y.

The flow after the section Y of FIG. 6 is the same as S105-S110 in FIG. 4 regarding the heat recovery mode. When the operation durations i, j reach the specified time n, the flow returns to the confluence X from a section Z in FIG. 5, and a loop from S203 is executed in cycle. Thus, the ventilator 8 is controlled such that the detected gas concentration detected by the gas concentration detector 9 is kept to the optimum gas concentration Cset that is appropriate for the stored objective.

That is, when the inside gas concentration Ct detected by the gas concentration detector 9 is lower than the specified first threshold, in other words, Cset−Clim, the blower fan 5 or the blower fan 6 of the ventilator 8 is controlled to be stopped (i.e., OFF). When the inside gas concentration Ct detected by the gas concentration detector 9 is higher than or equal to the specified second threshold, in other words, Cset+Clim, the heat recovery mode is performed, and the blower fan 5 or the blower fan 6 of the ventilator is controlled to be operated. At this time, when being lower than the specified first threshold, the blower fan of the ventilator may be stopped, and the ventilation duct of the ventilator may be closed by the door 7 (the door 7 is closed when the door switching apparatus 11 moves the door 7 in the left-right direction in FIG. 1). The specified time n (i.e., the specified time interval Tn) may preferably be set within a range from 10 to 55 seconds. Depending on a characteristic of gas of which concentration is detected, (i) the blower fan can be controlled to be stopped when the inside gas concentration Ct detected by the gas concentration detector 9 is between the first threshold and the second threshold, and (ii) the ventilator can be controlled to be operated when the inside gas concentration Ct is not within the range. In addition, it can be operated when the inside gas concentration is lower than the first threshold, and can be stopped when the inside gas concentration is higher than or equal to the second threshold.

Third Embodiment

Figure 7:
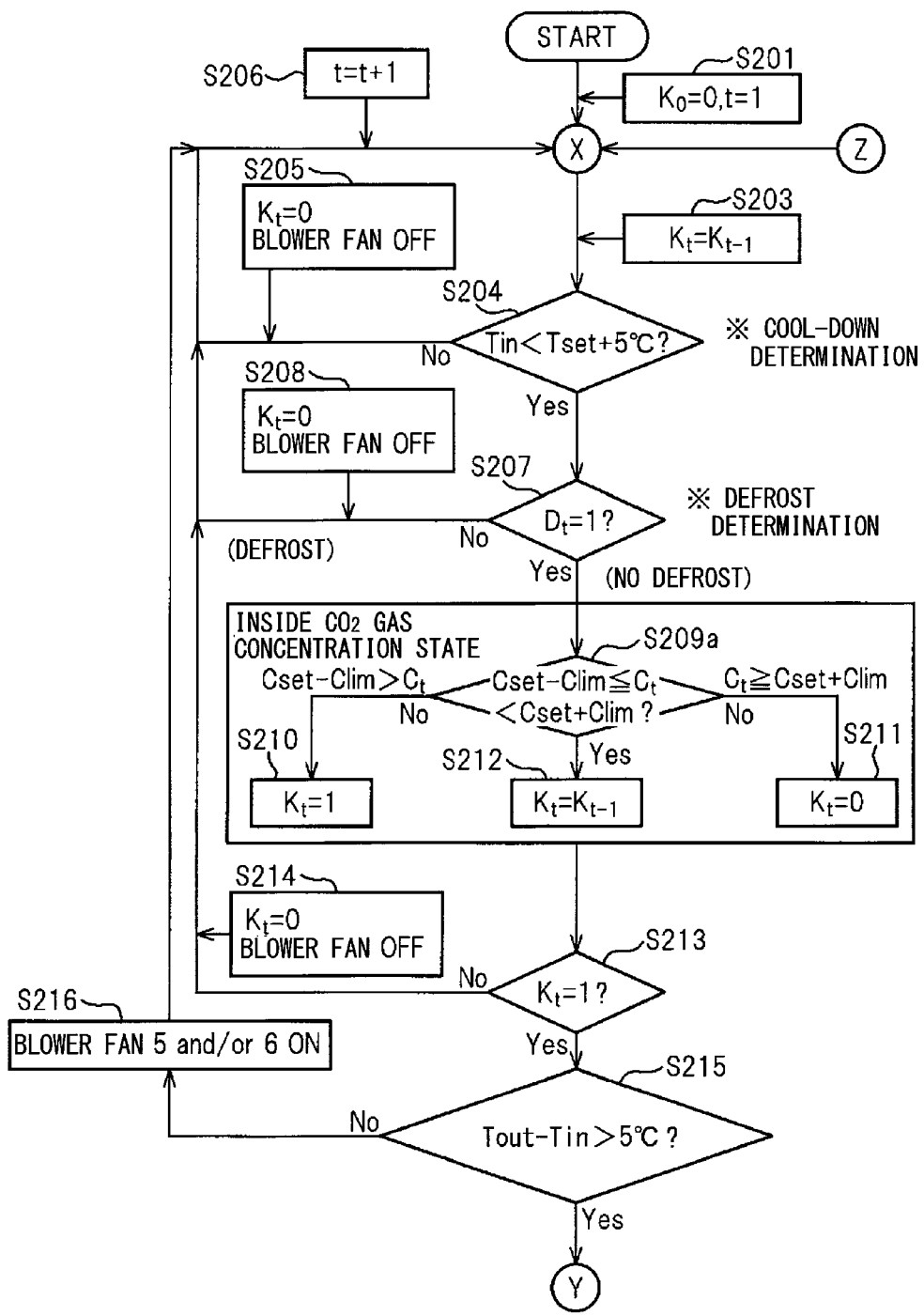
FIG. 7 is a control flow chart according to a third embodiment.
Figure 8:
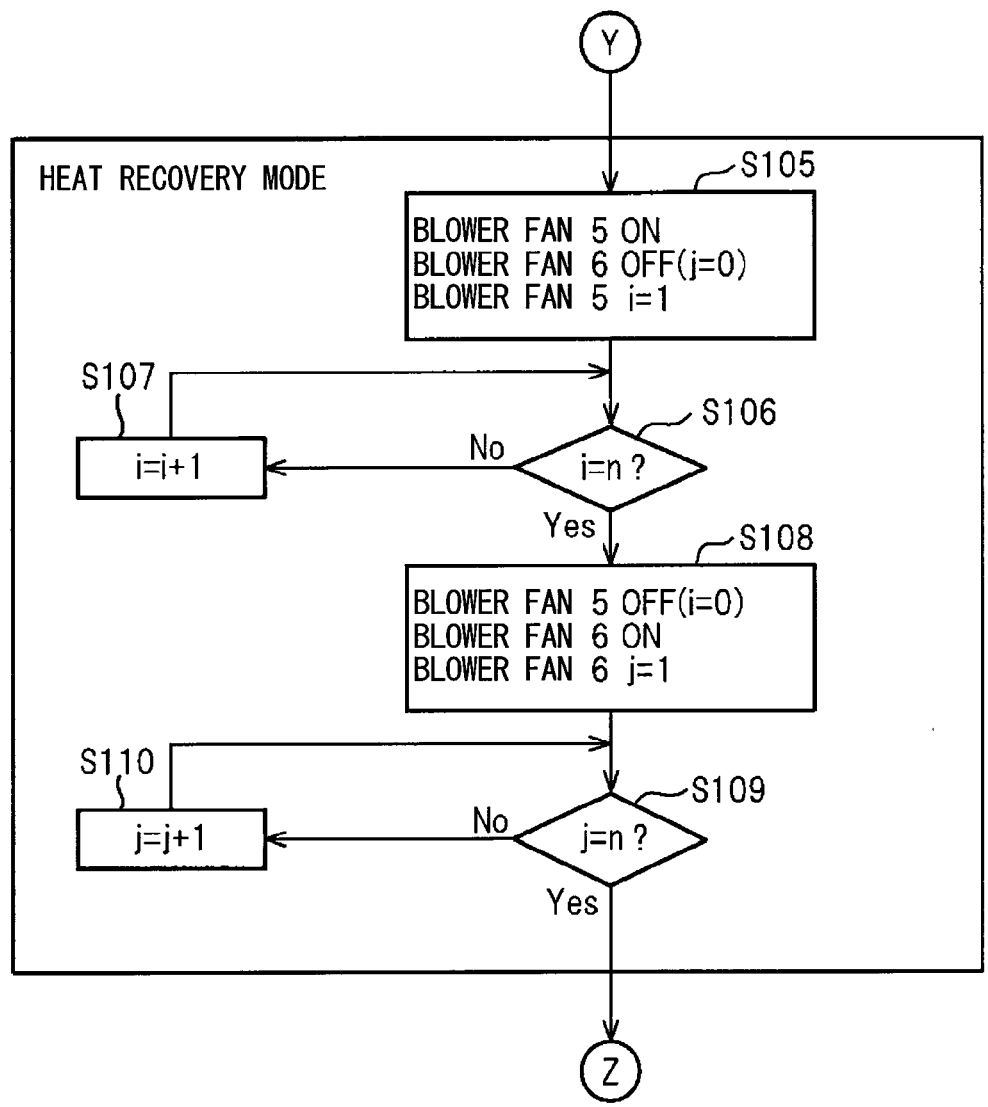
FIG. 8 is a control flow chart according to the third embodiment.

A third embodiment is an embodiment including a concentration-control and ventilation mode (i.e., a detection of $O_2$ gas concentration) as shown in FIGS. 7, 8. Flow charts regarding the concentration-control and ventilation mode are the same as the flow charts of FIGS. 5, 6 except for S209a that is changed from S209 of the flow charts of FIGS. 5, 6. That is, an $O_2$ gas concentration state is determined at S209a. At S209a, it is determined whether the detected gas concentration Ct detected by the gas concentration detector 9 is within the specified range Clim of the set gas concentration Cset or not. When Ct is higher than or equal to the upper limit (i.e., the second threshold) Cset+Clim, a flow of the flow chart in FIG. 7 advances to S211. And then, a present state is continued as $K_t=0$ (i.e., the blower fan is OFF), and the flow advances to S213. On the other hand, when Ct is lower than the lower limit (i.e., the first threshold) Cset−Clim, the flow advances to S210. Subsequently, the flow advances from S213 to S215 as $K_t=1$ (i.e., the blower fan is ON), the heat recovery mode is started, and the ventilation is performed. When Ct is higher than or equal to the lower limit (i.e., the first threshold) Cset−Clim and lower than the upper limit (i.e., the second threshold) Cset+Clim at S209a, a last value of $K_t$ is kept, and the flow advances to S213. In a case of $K_t=1$ at S213, the flow advances to S215. In a case of $K_t=0$, the loop is executed in cycle until $K_t$ is determined to be 1 at S213. When $K_t$ is determined to be 1 (i.e., the blower fan is ON), the flow advances from S213 to S215. Then, the heat recovery mode starts, and the ventilation is performed.

Fourth Embodiment

Figure 11A:
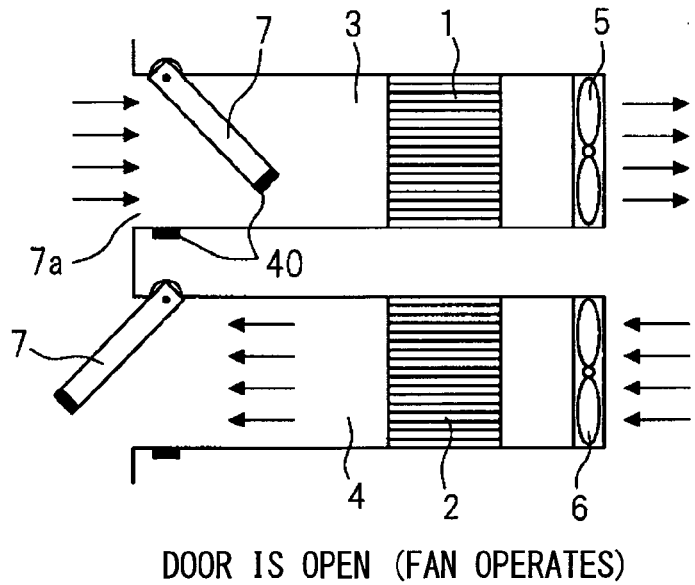
FIG. 11A is an enlarged cross-sectional diagram illustrating a part of a container for a refrigerant according to a fourth embodiment.
Figure 11B:
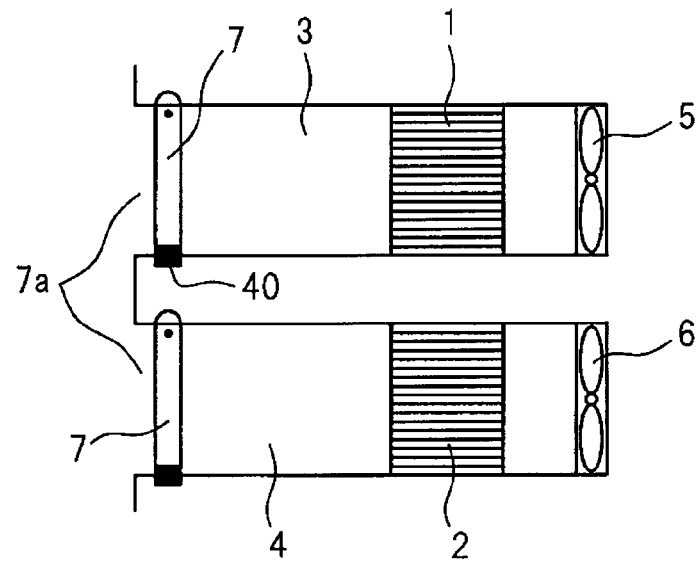
FIG. 11B is an enlarged cross-sectional diagram illustrating a part of the container for a refrigerant according to the fourth embodiment.

A fourth embodiment is an embodiment in which a mechanical operating member used for the door switching apparatus 11 is simplified as shown in FIGS. 11A, 11B. An upper portion of the door 7 is pivotally attached such that the door 7 is configured rotatably. When the blower fans 5, 6 are stopped, the door 7 closes the vent 7a of the ventilation ducts 3, 4 due to an own weight of the door 7. A magnet 40 made of a permanent magnet or an electromagnet is disposed to at least one of the door 7 or the vent 7a such that a closing state of the door 7 can be kept due to an attractive force of the magnet 40 when the blower fans 5, 6 is stopped, and when the door 7 is closed due to the own weight. When the blower fans 5, 6 are operated, the door 7 opens the vent 7a due to a pressure difference between the atmospheric pressure. The magnet 40 is arranged at an opposite side of the door that is opposite to a pivot attachment part of the door, and can be made either of the permanent magnet or the electromagnet. In a case of the electromagnet, responsibility may be high by turning OFF the electromagnet at the same time as the blower fan is ON. Furthermore, the magnet may be attached both of the door 7 and the vent 7a. Alternatively, the magnet 40 may be arranged at one of the door 7 or the vent 7a, and an iron piece may be arranged at an other of the door 7 or the vent 7a.

According to the present embodiment, the door switching apparatus 11 is not necessary. The door 7 is opened by using the attractive force and a wind pressure, and then, the ventilation starts. When the blower fans 5, 6 are turned OFF, the door 7 is closed due to the own weight, and the closing state is kept by the magnet 40. Since the upper portion of the door 7 is attached pivotally, the door 7 can close the vent 7a due to the own weight. When the blower fans 5, 6 are operated, the door 7 opens inward in the ventilation duct 3 as shown in FIG. 11A or opens outward in the ventilation duct 4 as shown in FIG. 11A due to a static pressure at an inside of the ventilation ducts 3, 4 and the pressure difference between the atmospheric pressure at an outside. A coil spring may be used instead of using the own weight. The coil spring is set at a neutral position in a no-torque state while the blower fans 5, 6 are stopped, and the door 7 can be opened inward or outward as shown in FIG. 11A by turning ON the blower fans 5, 6. In this case, a location of the door that is attached pivotally may be a lower portion of the door, and a torque due to the own weight can be used to open or close the door.

According to the embodiment shown in FIG. 1, since the door switching apparatus 11 uses the mechanical operating member or the like such as a solenoid or a motor to open or close the door 7, a life of the member should be considered in a salt damage environment. However, according to the fourth embodiment, the mechanical operating member is not necessary for the door switching apparatus 11, and a payment for changing members and a payment for maintenance can be reduced. Thus, cost can be reduced. Moreover, the structure is simplified, and the life can increase. The blower fans 5, 6 are effective as an anti-salt-damage measure by arranging the vent 7a, the heat storage bodies 1, 2, and the blower fans 5, 6, in this order, and by arranging the blower fans 5, 6 at a back side. The above door opening/closing mechanism using the magnet and an air-blowing force, according to the fourth embodiment, can be used in other similar devices such as an air conditioner.

The invention claimed is:

1. A container for a refrigerating machine comprising:
a storeroom storing a stored objective;
a housing chamber housing an evaporator and an evaporator fan and guiding an inside air in the storeroom to flowing back to the storeroom after passing through the evaporator;
a first ventilation duct having a first blower fan, a first heat storage body, and a first connecting port, the first ventilation duct being connected to the housing chamber through the first connecting port;
a second ventilation duct having a second blower fan, a second heat storage body, and a second connecting port, the second ventilation duct being connected to the housing chamber through the second connecting port; and
a controller controlling the first blower fan and the second blower fan, wherein
the controller controls the first blower fan and the second blower fan and switches between (i) a mode in which an outside air inflows through the first ventilation duct, and the inside air outflows through the second ventilation duct and (ii) a mode in which an outside air inflows through the second ventilation duct, and the inside air outflows through the first ventilation duct, at a specified time interval,
the first connecting port and the second connecting port are arranged to be parallel with each other in a flow direction of air flowing in the housing chamber, and
the first ventilation duct and the second ventilation duct are located on a same level in a vertical direction.

2. The container for a refrigerating machine according to claim 1, further comprising
a gas concentration detector detecting a gas concentration of the inside air, wherein
the controller regulates the gas concentration to be kept at an optimum gas concentration that is optimum for the stored objective by controlling the first blower fan and the second blower fan.

3. The container for a refrigerating machine according to claim 1, wherein
each of the first heat storage body and the second heat storage body has a length that is longer than or equal to 150 mm and shorter than or equal to 200 mm in a flow direction of the outside air or the inside air, and
each of the first heat storage body and the second heat storage body includes a latticed part having a hydraulic diameter that is longer than or equal to 1.5 mm and shorter than or equal to 2.0 mm and a thickness that is longer than or equal to 0.3 mm and shorter than or equal to 0.4 mm.

4. A container for a refrigerating machine comprising:
a storeroom storing a stored objective;
a housing chamber housing an evaporator and an evaporator fan and guiding an inside air in the storeroom to flowing back to the storeroom after passing through the evaporator;
a first ventilation duct connected to the housing chamber and having a first blower fan and a first heat storage body;
a second ventilation duct connected to the housing chamber and having a second blower fan and a second heat storage body; and
a controller controlling the first blower fan and the second blower fan, wherein the controller controls the first blower fan and the second blower fan and switches between (i) a mode in which an outside air inflows through the first ventilation duct, and the inside air outflows through the second ventilation duct and (ii) a mode in which an outside air inflows through the second ventilation duct, and the inside air outflows through the first ventilation duct, at a specified time interval, each of the first blower fan and the second blower fan is arranged to guide the outside air to inflowing when operated, the first ventilation duct and the second ventilation duct are located on a same level in a vertical direction, in the mode in which the outside air inflows through the first ventilation duct, and in which the inside air outflows through the second ventilation duct, only the first blower fan is operated, and the second blower fan is stopped, and in the mode in which the outside air inflows through the second ventilation duct, and in which the inside air outflows through the first ventilation duct, only the second blower fan is operated, and the first blower fan is stopped.

5. The container for a refrigerating machine according to claim 1, further comprising
a door closing the first ventilation duct and the second ventilation duct.

6. The container for a refrigerating machine according to claim 2, wherein
the gas concentration detector detects a carbon dioxide concentration or an oxygen concentration of the inside air or detects both of the carbon dioxide concentration and the oxygen concentration of the inside air.

7. The container for a refrigerating machine according to claim 2, wherein
the gas concentration detector detects a carbon dioxide concentration,
the first blower fan and the second blower fan are stopped when the carbon dioxide concentration detected by the gas concentration detector is lower than a specified first threshold value, and
the first blower fan and the second blower fan are operated when the carbon dioxide concentration detected by the gas concentration detector is higher than or equal to a specified second threshold value.

8. The container for a refrigerating machine according to claim 2, further comprising
a door closing the first ventilation duct and the second ventilation duct, wherein
the gas concentration detector detects a carbon dioxide concentration,
the first blower fan and the second blower fan are stopped, and the door closes the first ventilation duct and the second ventilation duct, when the carbon dioxide concentration detected by the gas concentration detector is lower than a specified first threshold value, and
the first blower fan and the second blower fan are operated when the carbon dioxide concentration detected by the gas concentration detector is higher than or equal to a specified second threshold value.

9. The container for a refrigerating machine according to claim 2, wherein
the gas concentration detector detects an oxygen concentration,
the first blower fan and the second blower fan are operated when the oxygen concentration detected by the gas concentration detector is lower than a first threshold value, and
the first blower fan and the second blower fan are stopped when the oxygen concentration detected by the gas concentration detector is higher than or equal to a second threshold value.

10. The container for a refrigerating machine according to claim 2, further comprising
a door closing the first ventilation duct and the second ventilation duct, wherein
the gas concentration detector detects an oxygen concentration,
the first blower fan and the second blower fan are operated when the oxygen concentration detected by the gas concentration detector is lower than a specified first threshold value, and
the first blower fan and the second blower fan are stopped, and the door closes the first ventilation duct and the second ventilation duct, when the oxygen concentration detected by the gas concentration detector is higher than or equal to a second threshold value.

11. The container for a refrigerating machine according to claim 1, wherein
the first ventilation duct, the second ventilation duct, the first blower fan, the second blower fan, the first heat storage body, and the second heat storage body are integrated with each other to provide a ventilator.

12. A container for a refrigerating machine comprising:
a storeroom storing a stored objective;
a housing chamber housing an evaporator and an evaporator fan and guiding an inside air in the storeroom to flowing back to the storeroom after passing through the evaporator;
a first ventilation duct having a first blower fan, a first heat storage body, and a first connecting port, the first ventilation duct being connected to the housing chamber through the first connecting port;
a second ventilation duct having a second blower fan, a second heat storage body, and a second connecting port, the second ventilation duct being connected to the housing chamber through the second connecting port;
a third ventilation duct, a pressure loss in the third ventilation duct being smaller than a pressure loss in the first ventilation duct or a pressure loss in the second ventilation duct; and
a controller controlling the first blower fan and the second blower fan, wherein
the first connecting port and the second connecting port are arranged to be parallel with each other in a flow direction of air flowing in the housing chamber, and
the first ventilation duct and the second ventilation duct are located on a same level in a vertical direction.

13. The container for a refrigerating machine according to claim 1, wherein
the specified time interval is set to be longer than or equal to 10 seconds and to be shorter than or equal to 55 seconds.

14. The container for a refrigerating machine according to claim 5, wherein
the door is provided to be rotatably,
at least one of the first ventilation duct or the second ventilation duct has a magnet made of a permanent magnet or an electromagnet, the door is kept to be closed due to an attractive force of the magnet when the door closes the first ventilation duct and the second ventilation duct, and the first ventilation duct and the second ventilation duct are open when the first blower fan and the second blower fan are operated.

15. The container for a refrigerating machine according to claim 1, wherein the first blower fan and the first heat storage body are disposed separately from each other in the first ventilation duct, and the second blower fan and the second heat storage body are disposed separately from each other in the second ventilation duct.

16. The container for a refrigerating machine according to claim 4, wherein the first blower fan and the first heat storage body are disposed separately from each other in the first ventilation duct, and the second blower fan and the second heat storage body are disposed separately from each other in the second ventilation duct.

17. The container for a refrigerating machine according to claim 12, wherein the first blower fan and the first heat storage body are disposed separately from each other in the first ventilation duct, and the second blower fan and the second heat storage body are disposed separately from each other in the second ventilation duct.

18. The container for a refrigerating machine according to claim 1, wherein the first blowing fan is located on a side of the first heat storage body adjacent to the housing chamber, and the second blowing fan is located on a side of the second heat storage body adjacent to the housing chamber.

19. The container for a refrigerating machine according to claim 4, wherein the first blowing fan is located on a side of the first heat storage body adjacent to the housing chamber, and the second blowing fan is located on a side of the second heat storage body adjacent to the housing chamber.

20. The container for a refrigerating machine according to claim 12, wherein the first blowing fan is located on a side of the first heat storage body adjacent to the housing chamber, and the second blowing fan is located on a side of the second heat storage body adjacent to the housing chamber.

* * * * *